United States Patent
Kao et al.

(10) Patent No.: US 9,342,612 B2
(45) Date of Patent: May 17, 2016

(54) PERSONALIZED BOOKMARKS FOR SOCIAL NETWORKING SYSTEM ACTIONS BASED ON USER ACTIVITY

(75) Inventors: Wayne Kao, Mountain View, CA (US); Bo Zhang, San Francisco, CA (US); Francis Luu, San Francisco, CA (US); Ming Hua, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/330,474

(22) Filed: Dec. 19, 2011

(65) Prior Publication Data

US 2013/0159314 A1    Jun. 20, 2013

(51) Int. Cl.
*G06F 17/30* (2006.01)

(52) U.S. Cl.
CPC .............................. *G06F 17/30884* (2013.01)

(58) Field of Classification Search
CPC .......... G06F 17/3053; G06F 17/30864; G06F 17/30038; G06F 17/30861; G06F 17/30867; G06F 17/30884
USPC ............... 707/723, 999.5, 798, 727; 709/224; 705/10
See application file for complete search history.

(56) References Cited

U.S. PATENT DOCUMENTS

| | | | |
|---|---|---|---|
| 6,526,440 B1* | 2/2003 | Bharat | 709/219 |
| 7,031,961 B2* | 4/2006 | Pitkow et al. | |
| 7,783,632 B2* | 8/2010 | Richardson et al. | 707/727 |
| 8,290,986 B2* | 10/2012 | Popescul et al. | 707/798 |
| 8,572,129 B1* | 10/2013 | Lee | G06F 17/30861 |
| | | | 707/798 |
| 9,129,259 B2* | 9/2015 | Carriero | G06Q 50/01 |
| 2007/0112761 A1* | 5/2007 | Xu et al. | 707/5 |
| 2007/0239734 A1* | 10/2007 | Arellanes | G06F 17/30696 |
| 2008/0154887 A1* | 6/2008 | Ryan et al. | 707/5 |
| 2008/0168340 A1* | 7/2008 | Jang | 715/206 |
| 2008/0270038 A1* | 10/2008 | Partovi et al. | 702/19 |
| 2009/0222551 A1* | 9/2009 | Neely | G06Q 30/02 |
| | | | 709/224 |
| 2010/0030734 A1* | 2/2010 | Chunilal | G06F 17/30867 |
| | | | 707/770 |
| 2010/0280920 A1* | 11/2010 | Scott et al. | 705/27 |
| 2010/0287033 A1* | 11/2010 | Mathur | 705/10 |
| 2011/0225291 A1* | 9/2011 | Dobroth et al. | 709/224 |
| 2011/0231363 A1* | 9/2011 | Rathod | G06F 17/30867 |
| | | | 707/609 |
| 2011/0238496 A1* | 9/2011 | Gurbuxani et al. | 705/14.49 |
| 2011/0289078 A1* | 11/2011 | Woodard | G06F 17/30884 |
| | | | 707/723 |
| 2011/0296004 A1* | 12/2011 | Swahar | 709/224 |
| 2012/0197881 A1* | 8/2012 | Blue et al. | 707/727 |
| 2012/0221557 A1* | 8/2012 | Edmonds et al. | 707/723 |
| 2012/0278127 A1* | 11/2012 | Kirakosyan et al. | 705/7.29 |
| 2014/0129942 A1* | 5/2014 | Rathod | H04N 21/44222 |
| | | | 715/720 |

OTHER PUBLICATIONS

GOlder et. al, The Structure of Collaborative Tagging Systems, 2006, Information Dynamics Lab, HP Labs, 8 pages.*

* cited by examiner

*Primary Examiner* — Noosha Arjomandi
(74) *Attorney, Agent, or Firm* — Fenwick & West LLP

(57) ABSTRACT

A social networking system provides a personalized set of bookmarks to a user based on the user's interactions with the bookmarks and/or the items associated with the bookmarks. The personalized set of bookmarks is grouped by category, and the categories are ordered in accordance with rankings for the categories. The rankings for the categories are determined based on the highest ranked item from each category of item, and the ranking of the items is determined based on the user's interactions with the bookmarks and/or associated items.

29 Claims, 4 Drawing Sheets

PERSONALIZED BOOKMARKS FOR SOCIAL NETWORKING SYSTEM ACTIONS BASED ON USER ACTIVITY

BACKGROUND

This invention relates generally to social networking, and in particular to providing personalized bookmarks to a user in an interface of a social networking system.

Bookmarks provide convenient access to pages, applications, and groups in an online system. Without a bookmark, a user may have to navigate though a menu structure or through multiple pages to reach a page, application or group.

In a conventional online system, the same set of bookmarks is displayed to all of the users. However, this static approach is not ideal for all users. For example, a user may have no interest in the items in the set of bookmarks. In systems where bookmarks are not static, users are typically required to set up and manage their own bookmarks. Accordingly, there is a need for better mechanisms for selecting and ordering bookmarks.

SUMMARY

Systems and methods are disclosed herein for generating personalized bookmarks for an interface of a social networking system based on user activity. These methods and systems help provide users with a set of personalized bookmarks without requiring user setup.

In one embodiment, a menu of bookmarks in an interface of a social networking system includes links to different items accessible in the system, arranged by category. Each of the items is associated with a category from a plurality of categories. The social networking system observes a user's interactions with at least some of the items in the menu of bookmarks, where the interactions may be via the menu of bookmarks and/or independent of it. The items are then ranked based on the user's interaction with the items. In one embodiment, a highest ranked item is determined for each category. The categories are ranked based on the highest ranked item for each category. A bookmark link is generated for each of the items, where the bookmark link provides a link to the corresponding item in the social networking system. A menu of bookmarks grouped by category is generated, where the categories are ordered in accordance with the relative ranking of the items corresponding to the bookmark links. The menu of bookmark links is sent to a user for display, for example in a display screen of the social networking system.

The figures depict various embodiments of the described methods and system and are for purposes of illustration only. One skilled in the art will readily recognize from the following discussion that alternative embodiments of the methods and systems illustrated herein may be employed without departing from the principles of the methods and systems described herein.

DETAILED DESCRIPTION

Overview of Generating Personalized Bookmarks

Figure 1:
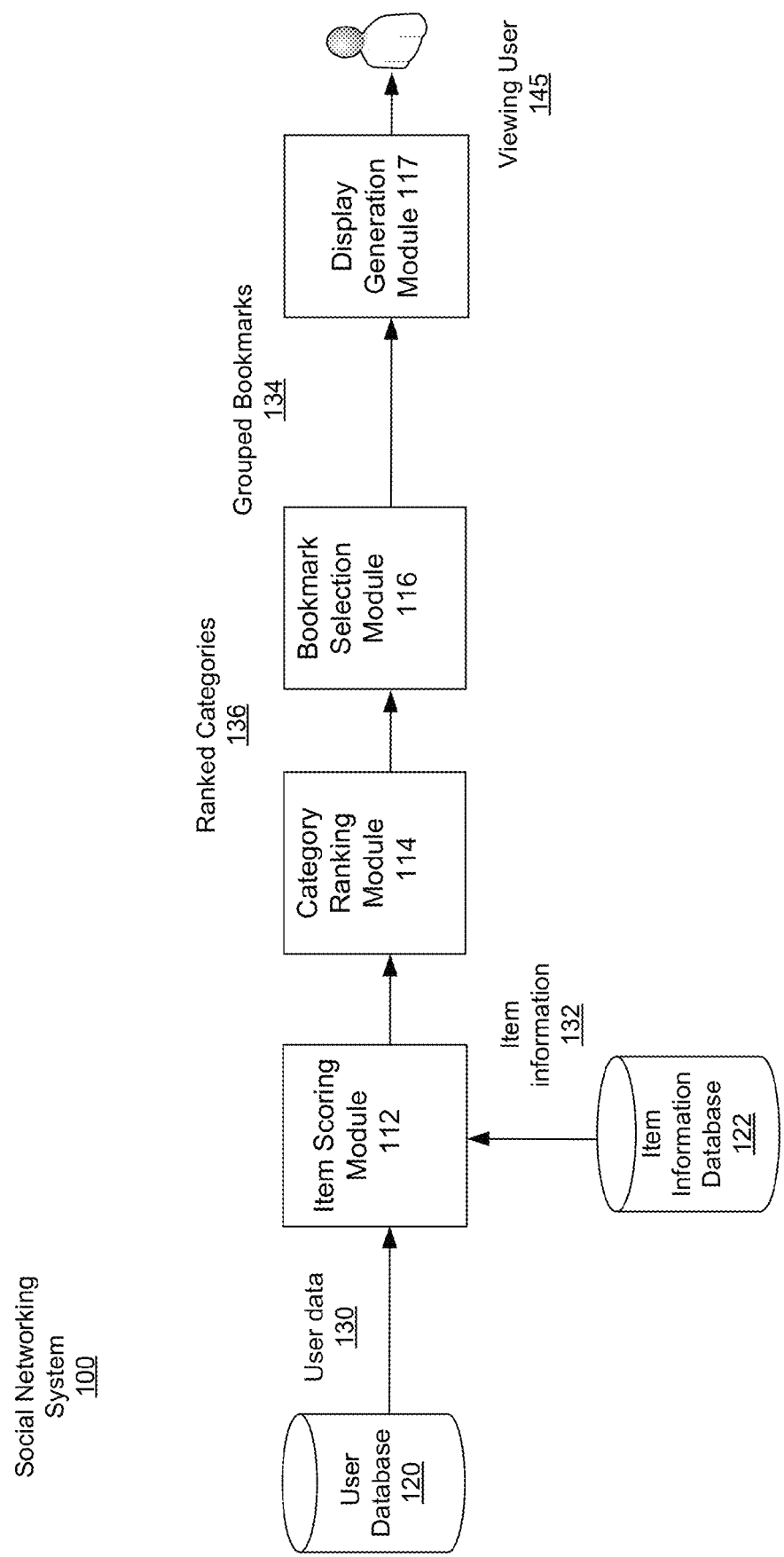
FIG. 1 is a high level block diagram illustrating a system environment suitable for generating personalized bookmarks based on user activity, in accordance with one embodiment of the invention.

FIG. 1 is a diagram of a social networking system 100 for generating personalized bookmarks based on user activity. Personalized bookmarks provide an effective tool for navigating a website or social networking system. Additionally, the personalized bookmarks disclosed herein need not require user setup or management. As illustrated in FIG. 1, the user database 120 provides a user's data 130 to the item scoring module 112 and the item information database 122 provides item information 132 to the item scoring module 112. The item scoring module 112 scores and ranks items based on the user's data 130 and the item information 132.

The items may provide access to interactive features of the social networking system, ether provided directly by the social networking system 100 or available via that system. For example, the items may include links to pages, groups, friend lists or friend profiles, a newsfeed, and applications. The applications may include, for example, a photo album application, a messaging application, an event planning application, an application offering deals, a marketplace application, a blogging application, an application for managing friend lists, a survey application, a gaming application, or any other application that can be accessed via the social networking system interface.

The category ranking module 114 determines items scores and generates a set of ranked categories 136 based on the item scores. In some embodiments, the category ranking module 114 determines the highest ranked item from each category and generates a set of ranked categories 136 based on the highest ranked item from each category. The bookmark selection module 116 generates a set of bookmarks 134. The set of bookmarks is grouped by category and the categories are ordered based on the set of ranked categories 136. The bookmark links in each category are ordered in accordance with the relative ranking of the items corresponding to the bookmark links. As used herein, a "bookmark" is a link or reference that provides a user with access to an interactive feature available via a social networking system. The set of bookmark links 134 is sent to the display generator module 117 to send to the user for display.

For each user, the user database 120 stores user account information, profile information, friendship or connection information, user activity information, usage statistics, user group information, friend list information, associated application information, favorite bookmark information, associated page information, item scoring information, and other user-related data. The profile information for the user may include the user's age, work experience, gender, educational history, interests, geographic location, marital status, household size, political party, and the like.

User group information includes a list of groups that a user belongs to. A group is an area where users can share and collaborate on a topic or idea. For example, a user may belong to a group about sports where users exchange opinions about sports. The associated application information includes a list of applications that a user's account is associated with. The applications may include the applications discussed above. The associated page information includes a list of pages that a user is associated with. In some embodiments, the pages are fan pages for a corporation, product, or public figure. Pages are organized by topic or entity and allow public figures and organizations to broadcast messages to their fans. Favorite bookmark information includes a list of items that a user frequently uses. Friend list information includes friend lists created by a user. A user may create lists of friends in order to make it easier to send messages to certain users, to filter content such as news stories and to control which users can view the user's information and posted content. In some embodiments, the information for a user includes notification numbers for items the user interacts with. For example, a notification number may indicate that there are a number of requests for a gaming application or that there are a number of event requests for a user. The item scoring information includes scores and rankings for items with which the user interacts.

User activity information includes information about a user's actions or interactions. The activity information may include a time stamp of when the interaction occurred, a target identifier for the item that the interaction was directed, the interaction type, and a duration of the activity. The interaction type may be specific to an item. For example, the type of interactions for an event planning application may include viewing an event, creating an event, responding to an event invitation, and posting content to a page associated with an event. The duration of an activity measures the amount of time a user spends interacting with an item. For example, the duration may measure the amount of time a user played a game. In some embodiments, the user activity information includes times and dates a user logs onto the social networking system 100.

The activity information may include usage statistics for a user's interactions. The usage statistics may include the number of times a user has selected a link corresponding to an application, a group, a bookmark, a friend list, or a page. The usage statistics may further include the amount of money a user spent in association with an item such as a game or application. For example, a user may have purchased virtual goods in a game. The usage statistics may include information identifying the time period in which the activities corresponding to the usage statistics took place. For example, the usage statistics may store the number of times a user has selected a link in a 30 day period. In some embodiments, the usage statistics include the number of times a user logs onto the social networking system in a predefined period of time or an system interaction rate. For example, a user may logon once a day or once a week.

The item information database 122 stores item information. The item information for an item may identify one or more categories associated with the item. In some embodiments, the categories include pages, groups, applications, and favorite bookmarks. In some embodiments, the item information for an item includes usage statistics for the item. The usage statistics may be determined from groups of users including connections of a particular user, users that share a profile characteristic with a particular user, or all users. The usage statistics for the item may include the average amount of time a user spends interacting with the item, the average amount of money a user spends on the item and the average number of clicks over a period of time for the item. In some embodiments, the item information for an item includes one or more popularity scores for the item. The one or more popularity scores may correspond to the different groups of users discussed above. In some embodiments, the item information database 122 stores an icon for each item, where the icon represents a respective item. For example, an icon for a gaming application may include a picture of an object in the game.

These embodiments describing generation of personalized bookmarks based on user activity are merely meant to be exemplary and are not intended to be restrictive. In other embodiments, there are more or fewer components performing the same or substantially similar functions as the components of the embodiment of FIG. 1. For instance, the user database 120 and the item information database 122 may all comprise the same storage entity. In addition, as will be discussed below, in some embodiments, the functionality of the item scoring module 112, the category ranking module 114 and display generator 117 module may be provided by the social networking system. In other embodiments, all or part of this functionality may be provided external to the social networking system.

System Overview

Figure 2:
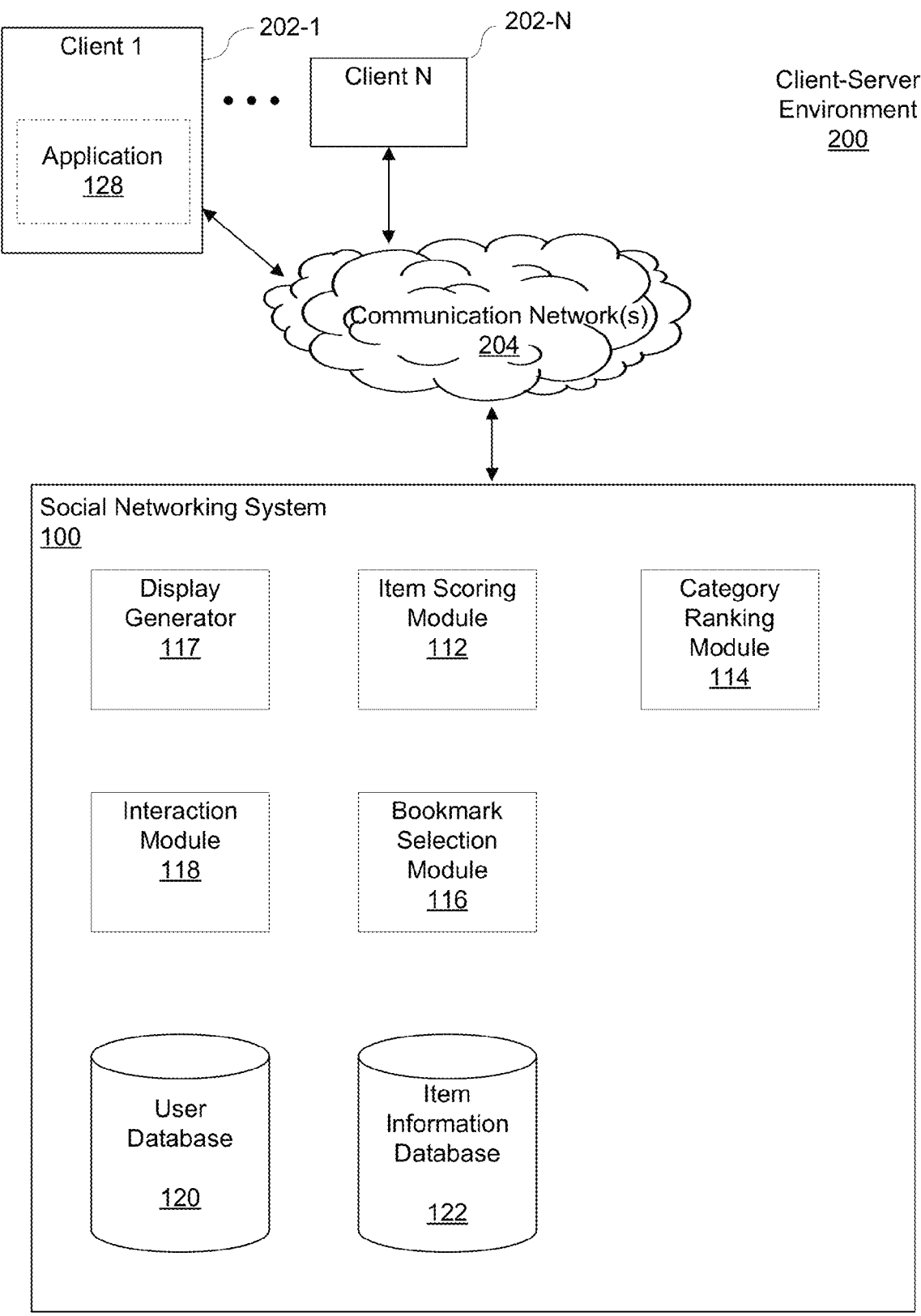
FIG. 2 is a high level block diagram illustrating a system environment suitable for generating personalized bookmarks based on user activity, in accordance with one embodiment of the invention.

FIG. 2 is a high level block diagram of a distributed system 200 according to one embodiment of the invention. The system 200 includes one or more clients 202 and a social networking system 100 connected by a network 204. In some embodiments, the social networking system 100 is implemented as a single server, while in other embodiments it is implemented as a distributed system of multiple servers. For convenience of explanation, the social networking system 100 is described below as being implemented on a single server system, but the social networking system 100 may be implemented on a plurality of server computers. In some embodiments, system 200 is a social networking system.

The communication network(s) 204 can be any wired or wireless local area network (LAN) and/or wide area network (WAN), such as an intranet, an extranet, or the Internet. It is sufficient that the communication network 204 provides communication capability between the client devices 202 and the social networking system 100. In some embodiments, the communication network 204 uses the HyperText Transport Protocol (HTTP) and the Transmission Control Protocol/Internet Protocol (TCP/IP) to transmit information between devices or systems. HTTP permits client device 202 to access various resources available via the communication network 204. The various embodiments of the invention, however, are not limited to the use of any particular protocol.

A user interacts with the social networking system 100 using a client device 202, which may be any suitable computer device that is capable of connecting to the social networking system 100 via communication network 204, such as a computer, a desktop computer, a laptop computer, a tablet device, a netbook, an internet kiosk, a personal digital assistants, a mobile phone and a gaming device. The client device 202 may communicate with the social networking system 100 via an application 228 such as a web browser or native application. Typical interactions between the client device 202 and the social networking system 100 include operations such as viewing profiles of other users of the social networking system 100, sending messages to other users, contributing and interacting with media items, joining groups, listing and confirming attendance at events, checking in at locations, liking certain pages, creating pages, and performing other tasks that facilitate social interaction.

The server system includes an interaction module 118, a display generator module 117, an item scoring module 112, a category ranking module 114, a user database 120 and an item information database 122.

The interaction module 118 monitors interactions on the system and updates information in the user database 120 and/or item information database 122. For example, the interaction module 118 may update a user's activity information in the user database 120 when the user plays a game. In this example, the interaction module 118 may also update item information for the game in the item information database 122. The interaction module 118 may also determine usage statistics for information stored in the item information database 122.

The item scoring module 112 scores and ranks items based on user activity. The scoring module 112 identifies a user, determines scores and ranks for the items the user has interacted with, and updates the user's information with the determined scores and ranks for the items. A user's score for an item or item score is determined based on the user's interactions with the item or a bookmark link for the item. The item scoring module 112 retrieves information about the user from the user database 120 and information about items from the item information database 122 in order to generate the user's item scores. The score for an item may include contributions from multiple factors. For example, the score for an item may be a product or sum of multiple scores determined based on different aspects of a user's activity with the item.

In some embodiments, the user's score for an item is based on the number of interactions the user has with the item. For example, an item that a user interacts with 40 times is scored higher than an item the user interacts with 10 times.

In some embodiments, the user's score for an item is based on the number of times the user interacted with the item over a period of time or the user's rate of interaction with the item. For example, a user may select the bookmark link for a game 40 times over a 30 day period. In some embodiments, the user's score for an item is decayed or weighted based on the user's rate of interaction with the social networking system 100. The system interaction rate corresponds to how often a user logs onto the social networking system 100. For example, a first decay factor or weight may be assigned to a user's items if the user logs onto the social networking system 100 once a day and a second decay factor or weight may be assigned to a user's items if the user logs onto the social networking system once a day. The item score module 112 may store a table that contains scores and/or decay factors for different rates of interaction.

In some embodiments, the user's interactions with an item are based on the number of interactions with an item that last for at least a predefined amount of time. In this case, inadvertent clicks are not considered when determining an item's score. For example, a user may inadvertently select a link for a game and then immediately exit the game.

In some embodiments, the user's score for an item is based the type of interaction the user has with the item. The item scoring module 112 may store a table that includes scores for different types of interactions for respective items. The table may, for example, store scores for different actions relating to a group item. In this example, the action of posting content to a group may be scored higher than the action of merely viewing the page of the group.

In some embodiments, the item scores may be decreased based on a decay factor. Thus, if a user does not interact with an item for some time, the score of the item will be decreased. Some embodiments employ the approach of accounting for the actions in specific windows of time, and discounting or weighting the windows of time differently. For example, actions in the last 30 days may be associated with a discount factor of 0.5 while actions in the last 90 days may be associated with a discount factor of 0.25.

In some embodiments, the score of an item is based at least in part on the amount of money a user spent in association with the item. The user's score for an item is increased in proportion to the amount of money the user spent in association with the item. For example, if the user spent 20 dollars on a gaming application and 10 dollars on a deal application, the user's score for the gaming application will be increased more than the user's score for the deal application.

In some embodiments, a user's score of an item is based at least in part on a popularity score for the item among a group of users. The group of users may include the user's friends, users that share a common profile characteristic with the user, or all users. The item scoring module 112 may retrieve popularity scores for a respective item from the item information database 122 and adjust the user's score for the item based on the retrieved popular scores. In some embodiments, the popularity score for the item is used to adjust the user's score for the item if the popularity score is above a threshold score. Thus, if an item is sufficiently popular with a group of users, the score of the item may be adjusted for the user in accordance with the popularity score.

In some embodiments, an item that the user has recently started to interact with is given a default score. For example, the user may have recently joined a group, joined a fan page or starting playing a game. The default scores may correspond to the user's average item score or a popularity score for the item.

In some embodiments, the item scoring module 112 ranks the scored items and produces a list of ranked items. The list of ranked items may be stored in the item scoring module 112 or the user database 120. The list of ranked items includes information identifying the items, scores for the items, and category information for each item. The category information for an item identifies one or more categories that the item belongs to.

The category ranking module 114 ranks categories of items. As discussed above, the categories may include pages, groups, favorite links, and applications. In some embodiments, the categories include user defined categories. The category ranking module 114 retrieves a user's list of ranked items from the item scoring module 112 or the user database 120 and ranks categories of items based on the retrieved list of ranked items.

In some embodiments, the highest ranked item per category is determined, and the categories are ranked based on the highest ranked item per category. More specifically, for each respective category, the category ranking module 114 identifies the highest ranked item for the respective category from the list of ranked items and adds the highest ranked item to a list of intermediate items. For example, if a respective category includes items X, Y, and Z, and if item X is the highest ranked item, item X is added to the list of intermediate items. The list of intermediate items includes the highest ranked item from each respective category. After the highest ranked item for each category is determined, the list of intermediate items is sorted by the score of the items and a list of category rankings is determined based on the sorted list of items. For example, if item A has a higher score than item B and item B has a higher score than item C, the category for item A is ranked higher than the category for item B and the category for item B is ranked higher than the category for item C. The category ranking module 114 sends the list of ranked categories to the bookmark selection module 116.

In some embodiments, the category ranking module 114 ranks categories of items based on the average item score for the items in a category. For example, if the average score for the items in a first category is higher than the average item score for items in a second category, the first category is ranked higher than the second category.

In some embodiments, the category ranking module 114 score a category based on the scores of the items in the category, where the item scores are exponentially decayed. For example, the user's score for a first item in a category contributes a first amount to a category score and the user's score for a second item contributes a second amount to the category score, and so on. In some embodiments, the first amount may be predefined and the subsequent amounts may be determined based on a decay factor. For example, the second amount may be determined based on the first amount and a decay factor or the second amount may be defined in a table stored with the category ranking module 114. In some embodiments, the ordering the items is determined based on the user's score for the items. For example, the first item is the highest scored item, the second item is the second highest scored item, and so on.

The bookmark selection module 116 generates a list of personalized bookmarks. In some embodiments, the bookmark selection module 116 periodically generates a list of personalized bookmarks for a user. For example, the list may be generated once a day, once a week, once a month, or at a certain time. In some embodiments, the list of personalized bookmarks is generated for a user in response to the user requesting a page. The requested page may be a home page, a photo album, a message page, an application page, a profile page, or any other user interface of the social networking system for which the list of bookmarks may be useful to aid the user in navigating the system.

In order to generate the list of personalized bookmarks, the bookmark selection module 116 sends a request to the item scoring module 112 for a list of ranked items and a request to the category ranking module 114 for a list of ranked categories. For each respective category in the list of ranked categories, the bookmark selection module 116 selects a number of items corresponding to the respective category based on the ranking of the items. For example, the bookmark selection module 116 may select the five highest ranked groups, pages, friend lists and applications. In some embodiments, the items with a score or ranking above a threshold are selected. Bookmark links are generated for the selected items, grouped by categories and sent to the display generator 112.

Figure 4:
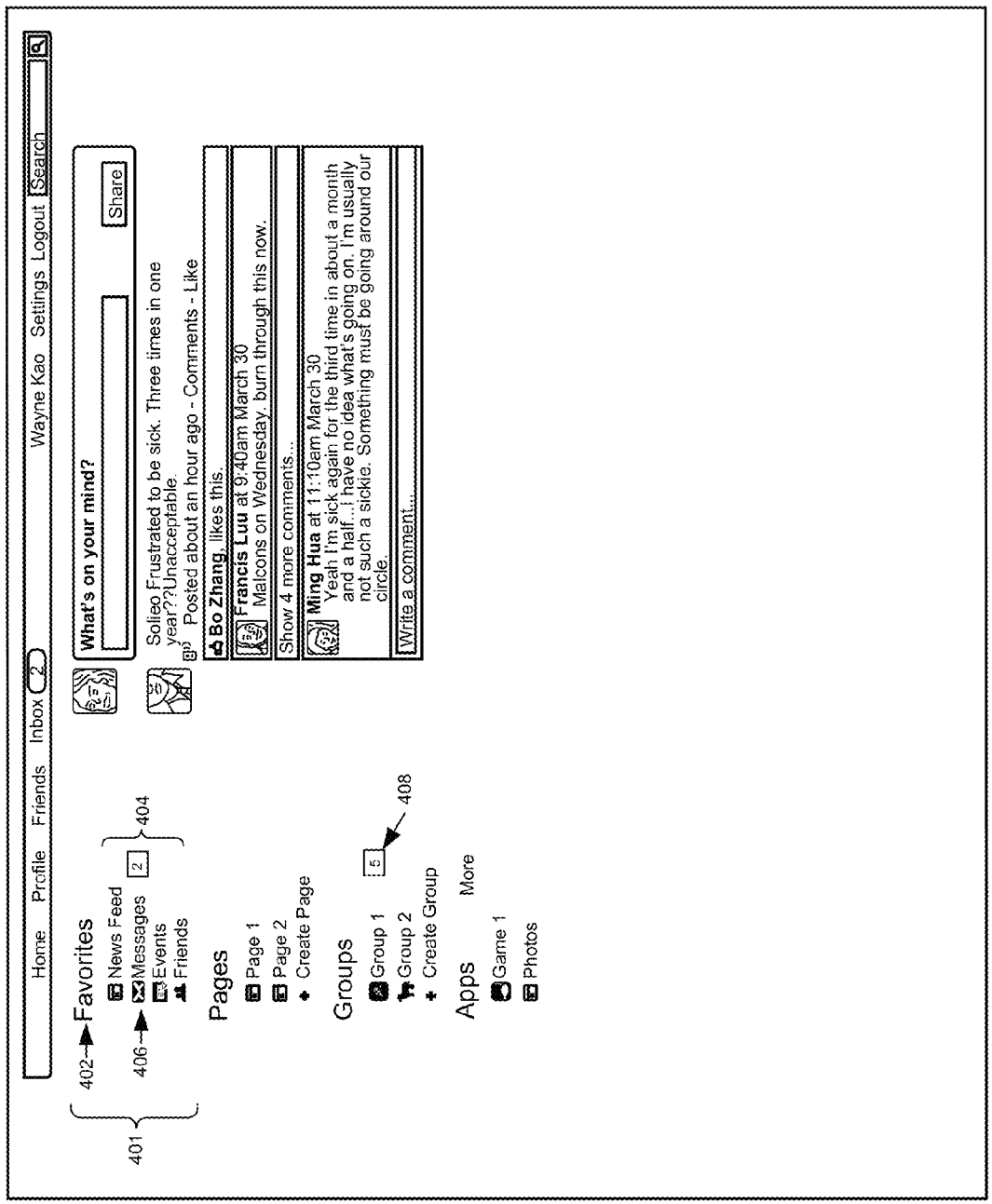
FIG. 4 is a screenshot of a set of personalized bookmarks, in accordance with an embodiment of the invention.

The display generator 112 formats the list of bookmarks for display. A menu of bookmark links is generated. The menu displays bookmarks grouped by categories where the groups are ordered based on the ranking of the categories. The group corresponding to the highest ranked category is positioned first in the menu. Each group includes a header describing the corresponding category followed by one or more bookmarks. For example, as shown in FIG. 4, a group 401 includes a header 402 that describes the category of the group 401 as "Favorites" and a set of bookmarks 404. In some embodiments, the bookmarks within a group are ordered based on scores associated with the items corresponding to the bookmarks. In some embodiments, the last bookmark in a group corresponds to the most recently used bookmark of the group.

In some embodiments, a user may define a set of bookmarks as their "Favorites" or the "Favorite" bookmarks may correspond to the user's N highest scored items. The "Favorite" bookmarks may correspond to one or more categories of bookmarks. In some embodiments, the "Favorite" bookmarks are displayed as the first item in each category. For example, if a game is one of the user's "Favorite" bookmarks, a bookmark for the game is displayed first in the group of bookmarks corresponding to applications.

In some embodiments, the display generator 112 hides or does not include categories of bookmarks that have scores below a threshold score. As discussed above, the score for a category may correspond to the score of the highest scored item in the category, the average score of the items in the category, or based on the exponential decay of item scores in the category. In some embodiments, the display generator 112 hides or does not include categories of bookmarks that a user has not interacted with for a threshold amount of time. For example, if a user has not interacted with any items in the application category for a month, the application category of bookmarks is not displayed or included in the menu.

In some embodiments, an icon is added for each bookmark. An icon may represent a bookmark or an object associated with the bookmark. For example, as shown in FIG. 4, an icon 406 for a bookmark corresponding to a messaging application may depict an envelope. The icons may be displayed adjacent to the bookmarks. The display generator 112 may retrieve an icon for a bookmark from the item information database 122. In some embodiments, the display generator 112 formats the list of bookmarks for display in a mobile device.

In some embodiments, the display generator 112 adds notification numbers to the menu to be displayed next to respective bookmarks. The display generator 112 retrieves a user's data from the user database 120 to determine whether there are notifications corresponding to the items in the bookmark list. The notification number has a different meaning for different items. For example, a messaging application may have a notification number indicating the number of unread messages in the messaging application. In some embodiments, the notification number for a bookmark is displayed next to the bookmark. For example, as shown in FIG. 4, a notification number 408 may be displayed next to a bookmark to indicate the number of new messages in a group. In some embodiments, the menu includes instructions to clear the notification number for a bookmark after the bookmark is selected. In some embodiments, the display generator 112 includes a "more" link with each group of bookmarks. When the "more" link is selected by a user, the user is navigated to a page showing an expanded set of links for a respective category. For example, if only two application links are displayed, a user may select the "more" link to view a page with additional application links or otherwise to expand the list. The list of bookmarks is displayed in a contiguous region of a page. In some embodiments, the list of personalized bookmarks is formatted to be displayed along with a newsfeed, a photo album, a profile page, an application, a group page, friend lists, or a fan page.

In some embodiments, the menu includes instructions to display an edit icon next to a bookmark when a user's cursor is over the bookmark. When selected, the edit icon displays options to enable a user to add a respective bookmark to the user's "Favorite" bookmarks or to demote the bookmark and have it removed from display.

Personalized Bookmarks Based on User Activity

Figure 3:
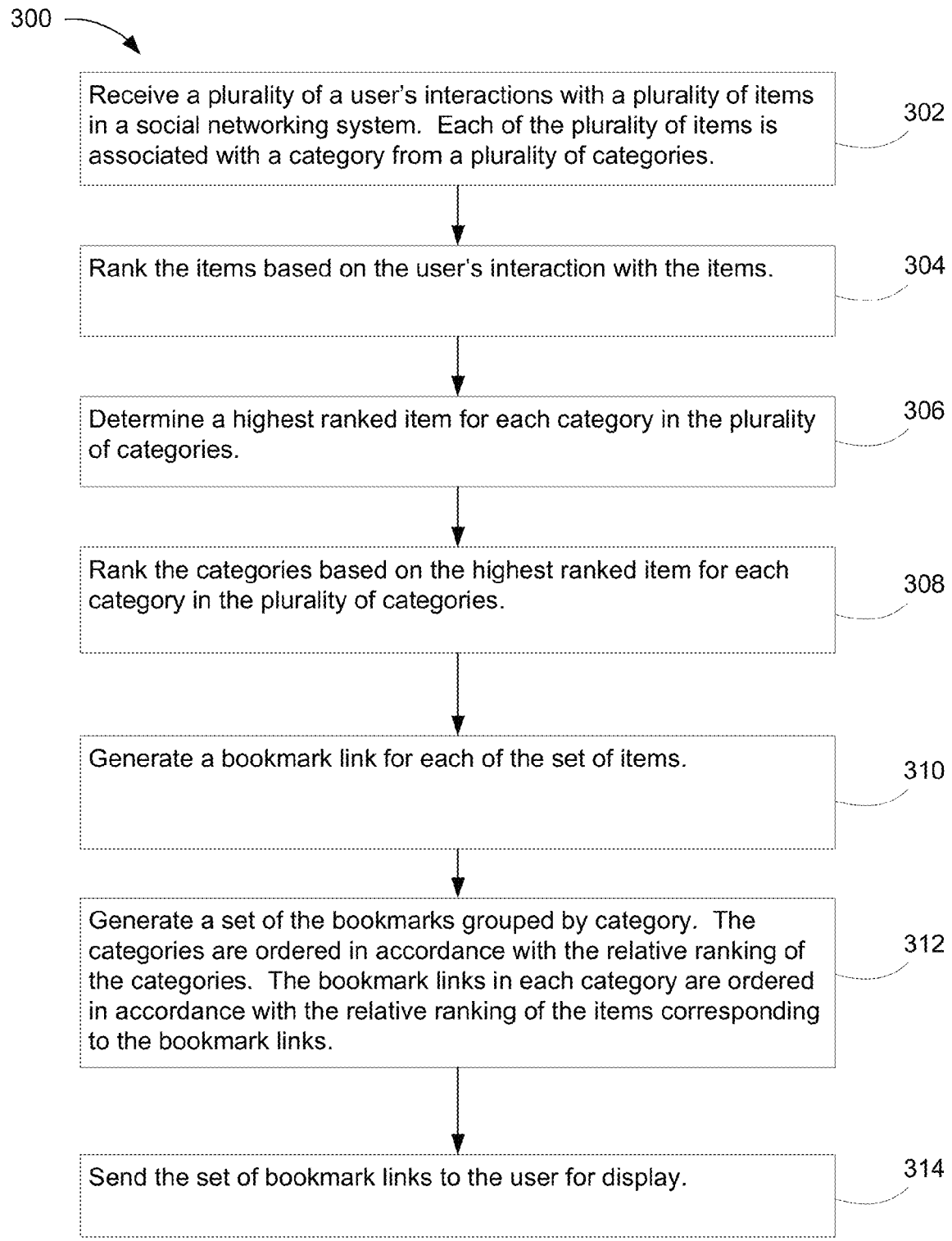
FIG. 3 is a flow chart illustrating a process for generating personalized bookmarks based on user activity, in accordance with an embodiment of the invention.

FIG. 3 is a flow chart of a process 300 for generating personalized bookmarks based on user activity, in accordance with one embodiment of the invention. This process 300 may be performed at a server system (e.g., social networking system 100) having one or more processors and non-transitory memory. The non-transitory memory stores one or more programs to be executed by the one or more processors. The one or more programs include instructions for carrying out the process 300.

In this process 300, the interaction module 112 receives 302 a plurality of a user's interactions with a plurality of items in a social networking system. Each of the plurality of items is associated with a category from a plurality of categories. In some embodiments, the categories include pages, groups, applications, and favorite bookmarks. Some of the items may be associated with multiple categories. For example, a game may be associated with the application category and the favorite bookmarks category. The items have been discussed above.

The item ranking module 112 ranks 304 the items based on the user's interactions with the items. The interactions may be with the items or with links corresponding to the items. In some embodiments, the ranking of items is based on the number of times over a period of time the user interacted with the items. For example, a user may have interacted with a group 25 times in a 30-day period, or the user may interact with a page 12 times a week.

In some embodiments, the ranking of the items is based on the types of interactions the user has with the items. The types of interactions are specific to the items and certain interactions with an item may be scored higher than other interactions. For example, responding to an event invitation is scored higher than viewing an event because responding to an event invitation is a stronger indicator of the user's interest.

In some embodiments, the ranking of the items is based on the duration of the interactions. It may be convenient for the user to have bookmarks to items that he or she spends a lot of time interacting with. Thus, some items may be ranked or scored higher in accordance with the duration of the user's interactions with the item.

In some embodiments, the user's interactions are discounted based on a decay factor. The decay factor may be based on the timestamp of each of the user's interactions with an item. Thus, if a user stops interacting with an item, the ranking of the item will tend to decrease. The decay factor may cause the user's interactions to diminish slowly over time, or it may be a discrete decay that completely discounts any user interactions that are over a specified age. The decay factor may also depend on the type of user interaction. For example, a user interaction in which a user posts on a page may be decayed less than a user interaction in which a user merely views a post on a page.

In some embodiments, the ranking for at least one item is based in part on an amount of money a user has spent on goods or services offered by the item. The amount of money a user is willing to spend in association with an item may indicate how important an item is to the user. For example, a user may have spent money in a game to unlock certain features of the game or to buy virtual goods in the game.

In some embodiments, the ranking for at least one item is based at least in part on a popularity of the item among a plurality of users in addition to the user for whom the bookmarks are being ranked. The plurality of users may be the user's friends, the users who share a common characteristic with the user, or all users of the system.

The category ranking module 114 determines 306 a highest ranked item for each category in the plurality of categories. For example, the highest ranked item from the application category is determined. The category ranking module 114 ranks 308 the categories based on the highest ranked item for each category in the plurality of categories. For example, category 1 is ranked higher than category 2 if the highest ranked item from category 1 is ranked higher than the highest ranked item from category 2. The category corresponding to the highest ranked item is the highest ranked category, the category corresponding to the next highest ranked item not belonging to the first category is the second highest ranked category, and so on.

The bookmark selection module 116 generates 310 a bookmark link for each of the set of items. A bookmark link provides a link to the corresponding item in the social networking system. The bookmark selection module 116 generates 312 a set of bookmark links grouped by category. For example, the bookmarks corresponding to the application category may be grouped together. The groups of bookmarks are ordered in accordance with the ranking of the corresponding categories. For example, the group of bookmarks corresponding to the highest ranked category is placed in the first position. Within each group, the bookmark links are ordered in accordance with the scores associated with the items corresponding to the bookmark links. For example, within the application group, the bookmarks are ordered based on the user's scores for the applications corresponding to the bookmarks. The display generator 117 formats the bookmark links for display as discussed above. The display generator 117 sends the set of bookmark links to the user for display.

Summary

The foregoing description of the embodiments of the invention has been presented for the purpose of illustration; it is not intended to be exhaustive or to limit the systems and methods to the precise forms disclosed. Persons skilled in the relevant art can appreciate that many modifications and variations are possible in light of the above disclosure.

Some portions of this description describe the embodiments of the systems and methods in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the systems and methods may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the systems and methods may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the systems and methods systems and methods be limited not by this detailed description, but rather by any claims that issue on an application based hereon. Accordingly, the disclosure of the embodiments of the systems and methods are intended to be illustrative, but not limiting, of the scope of the invention, which is set forth in the following claims.

What is claimed is:

1. A computer-implemented method comprising:
    receiving a plurality of a particular user's interactions with a plurality of items in a social networking system, each item associated with a category;
    ranking the items based on the particular user's interactions with the items, each interaction discounted based on a time elapsed since the particular user last interacted with an item;
    for the particular user, ranking the categories based on the item rankings of the items within each category;
    for the particular user, generating by the social networking system a bookmark link for each item, each bookmark link providing a link to the corresponding item in the social networking system; and
    sending the bookmark links grouped by category to the particular user for display, the bookmark links ordered within each category based on the item rankings of the corresponding items within the category, and the categories ordered based on the ranking of the categories.

2. The method of claim 1, wherein each category is selected from the group consisting of favorite bookmarks, groups, applications and pages.

3. The method of claim 1, wherein the ranking of the items is based on the number of times over a period of time the user interacted with the items.

4. The method of claim 1, wherein the ranking of the items is based on types of interactions the user has with the items.

5. The method of claim 1, wherein the ranking of the items is based on a duration of the interactions.

6. The method of claim 1, wherein the ranking for at least one item is based at least in part on an amount of money a particular user has spent on goods or services offered by the item.

7. The method of claim 6 wherein the ranking for the item is increased proportionally to the amount of money the particular user spends in association with the item.

8. The method of claim 1, wherein the ranking for the items is based at least in part on popularity of the items among a group of users.

9. The method of claim 8, wherein the group of users is selected from the particular user's friends, users who share a common characteristic with the particular user, or all users of the social networking system.

10. The method of claim 1, wherein an inadvertent interaction with an item by the particular user is not considered when determining the ranking of the item.

11. The method of claim 1, wherein a bookmark link is generated for the particular user in response to the viewing user requesting a page.

12. The method of claim 11, wherein the requested page is at least one of a home page, a photo album, a message page, an application page, or a profile page.

13. The method of claim 1, wherein bookmark links are generated periodically for the particular user.

14. The method of claim 1, further comprising determining a highest ranked item for each category, and ranking the categories based on the highest ranked item for each category, wherein a category associated with a higher ranked item is ranked more highly than a category associated with a lower ranked item.

15. The method of claim 1, wherein the categories are ranked based on the average rank of all of the items in each category.

16. The method of claim 1 wherein the ranking of the item decreases as the amount of time increases from the time elapsed since the particular user last interacted with the item.

17. A non-transitory computer readable storage medium storing one or more programs configured to be executed by a server system, the one or more programs comprising instructions for:
    receiving a plurality of a particular user's interactions with a plurality of items in a social networking system, each item associated with a category;
    ranking the items based on the particular user's interactions with the items, each interaction discounted based on a time elapsed since the particular user interacted with an item;
    for the particular user, ranking the categories based on the item rankings of the items within each category;
    for the particular user, generating by the social networking system a bookmark link for each item, each bookmark link providing a link to the corresponding item in the social networking system; and
    sending the bookmark links grouped by category to the particular user for display, the bookmark links ordered within each category based on the item rankings of the corresponding items within the category, and the categories ordered based on the ranking of the categories.

18. The computer readable storage medium of claim 17, wherein the ranking of the items is based on the number of times over a period of time the particular user interacted with the items.

19. A computer-implemented method comprising:
    receiving a plurality of a particular user's interactions with a plurality of items in a social networking system, each item associated with a category;
    ranking the items based on the particular user's interactions with the items, each interaction discounted based on a time elapsed since the particular user interacted with an item;
    for the particular user, ranking the categories based on the rankings of the items within each category; and
    sending bookmark links grouped by category to the particular user for display, the bookmark links ordered within each category based on the item rankings of the corresponding items within the category, and the categories ordered based on the ranking of the categories.

20. A system comprising:
    a processor; and
    a non-transitory computer-readable storage medium coupled to the processor, the computer-readable storage medium having instructions encoded thereon that, when executed by the processor, cause the processor to:
        receive a plurality of a particular user's interactions with a plurality of items in a social networking system, each item associated with a category;
        rank the items based on the particular user's interactions with the items, each interaction discounted based on a time elapsed since the particular user last interacted with an item;
        for the particular user, rank the categories based on the item rankings of the items within each category;
        for the particular user, generate by the social networking system a bookmark link for each item, each bookmark link providing a link to the corresponding item in the social networking system; and send the bookmark links grouped by category to the particular user for display, the bookmark links ordered within each category based on the item rankings of the corresponding items within the category, and the categories ordered based on the ranking of the categories.

21. A non-transitory computer readable storage medium storing one or more programs configured to be executed by a server system, the one or more programs comprising instructions for:
receiving a plurality of a particular user's interactions with a plurality of items in a social networking system, each item associated with a category;
ranking the items based on the particular user's interactions with the items, each interaction discounted based on a time elapsed since the particular user interacted with an item;
for the particular user, ranking the categories based on the rankings of the items within each category; and
sending bookmark links grouped by category to the particular user for display, the bookmark links ordered within each category based on the item rankings of the corresponding items within the category, and the categories ordered based on the ranking of the categories.

22. The computer readable storage medium of claim 21, wherein an inadvertent interaction with an item by the particular user is not considered when determining the ranking of the item.

23. The computer readable storage medium of claim 21, wherein a bookmark link is generated for the particular user in response to the viewing user requesting a page.

24. The computer readable storage medium of claim 23, wherein the requested page is at least one of a home page, a photo album, a message page, an application page, or a profile page.

25. The computer readable storage medium of claim 21, wherein bookmark links are generated periodically for the particular user.

26. The computer readable storage medium of claim 21, further comprising determining a highest ranked item for each category, and ranking the categories based on the highest ranked item for each category, wherein a category associated with a higher ranked item is ranked more highly than a category associated with a lower ranked item.

27. The computer readable storage medium of claim 21, wherein the categories are ranked based on the average rank of all of the items in each category.

28. The computer readable storage medium of claim 21, wherein the ranking of the item decreases as the amount of time increases from the time elapsed since the particular user last interacted with the item.

29. A system comprising:
a processor; and
a non-transitory computer-readable storage medium coupled to the processor, the computer-readable storage medium having instructions encoded thereon that, when executed by the processor, cause the processor to:
receive a plurality of a particular user's interactions with a plurality of items in a social networking system, each item associated with a category;
rank the items based on the particular user's interactions with the items, each interaction discounted based on a time elapsed since the particular user interacted with an item;
for the particular user, rank the categories based on the rankings of the items within each category; and
send bookmark links grouped by category to the particular user for display, the bookmark links ordered within each category based on the item rankings of the corresponding items within the category, and the categories ordered based on the ranking of the categories.

* * * * *